(12) United States Patent
Sawant et al.

(10) Patent No.: US 8,349,951 B2
(45) Date of Patent: Jan. 8, 2013

(54) POLYTHIOETHER POLYMERS AND CURABLE COMPOSITIONS CONTAINING THEM

(75) Inventors: Suresh Sawant, Stevenson Ranch, CA (US); Chandra Bhushan Rao, Valencia, CA (US); Jak H. Aklian, North Hollywood, CA (US)

(73) Assignee: PRC DeSoto International, Inc., Sylmar, CA (US)

( * ) Notice: Subject to any disclaimer, the term of this patent is extended or adjusted under 35 U.S.C. 154(b) by 1676 days.

(21) Appl. No.: 11/141,477

(22) Filed: May 31, 2005

(65) Prior Publication Data
US 2006/0270796 A1 Nov. 30, 2006

(51) Int. Cl.
C08F 8/30 (2006.01)
(52) U.S. Cl. ........................................ 525/126; 525/437
(58) Field of Classification Search ........................ None
See application file for complete search history.

(56) References Cited

U.S. PATENT DOCUMENTS

| | | | |
|---|---|---|---|
| 2,466,963 A | 4/1949 | Patrick et al. | 260/79.1 |
| 3,729,404 A | 4/1973 | Morgan | 204/159.15 |
| 4,008,341 A | 2/1977 | Kehr | 427/44 |
| 4,020,233 A * | 4/1977 | Morgan | 428/419 |
| 4,366,307 A | 12/1982 | Singh et al. | 528/373 |
| 4,439,291 A | 3/1984 | Irving et al. | 204/159.23 |
| 4,609,762 A | 9/1986 | Morris et al. | 568/38 |
| 4,742,133 A | 5/1988 | Tang et al. | 526/235 |
| 5,225,472 A | 7/1993 | Cameron et al. | 524/368 |
| 5,593,795 A | 1/1997 | Chen et al. | |
| 5,912,319 A * | 6/1999 | Zook et al. | 528/373 |
| 5,959,071 A | 9/1999 | DeMoss et al. | 528/378 |
| 6,232,401 B1 | 5/2001 | Zook et al. | 525/191 |
| 6,372,849 B2 | 4/2002 | DeMoss et al. | 525/212 |
| 6,486,297 B2 | 11/2002 | Zook et al. | 528/373 |
| 6,509,418 B1 | 1/2003 | Zook et al. | 525/212 |
| 6,740,707 B2 | 5/2004 | Ono et al. | 525/64 |
| 2004/0072933 A1 | 4/2004 | Shustack | 524/280 |
| 2004/0247792 A1* | 12/2004 | Sawant et al. | 427/385.5 |

FOREIGN PATENT DOCUMENTS

| | | |
|---|---|---|
| EP | 1616886 | 1/2006 |
| GB | 1508692 | 4/1978 |
| RU | 2205197 | 5/2003 |
| SU | 239161 | 11/1969 |

OTHER PUBLICATIONS

Simone Tomasi J. of Bioactive and Compatible Polymers V.17, Jan. 2002, p. 3-21.*
U.S. Appl. No. 10/990,621, filed Nov. 17, 2004, of Suresh G. Sawant et al. entitled "Selectively Strippable Intermediate Coatings and Methods of Use".
Simone Tomasi et al., "Poly(Ester-Sulfide)s from Oligo(Oxyethylene)Dithiols and Bis(Acrylates)", Journal of Bioactive and Compatible Polymers, Lancaster, PA, vol. 17, No. 1, Jan. 2002.

* cited by examiner

Primary Examiner — Anne Gussow
Assistant Examiner — Thurman Wheeler
(74) Attorney, Agent, or Firm — Bill Lambert

(57) ABSTRACT

Polymers are disclosed that include a structure having the formula

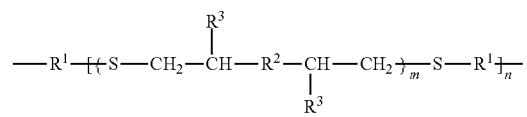

wherein, $R^1$ is independently selected from a $C_{2-10}$ n-alkylene group, a $C_{2-6}$ branched alkylene group, a $C_{6-8}$ cycloalkylene group, a $C_{6-10}$ alkylcycloalkylene group, $—[(—CH_2—)_p—X—]_q—(—CH_2—)_r—$, or $—[(—CH_2—)_p—X—]_q—(—CH_2—)_r—$, wherein at least one $—CH_2—$ unit is substituted with a methyl group, wherein p is an integer having a value ranging from 2 to 6, q is an integer having a value ranging from 1 to 5, r is an integer having a value ranging from 2 to 10, and X is selected from O, S, and —NR—, wherein R is hydrogen or methyl; $R^2$ denotes a structure derived from allyl (meth)acrylate or a multi-functional (meth)acrylate; $R^3$ is independently selected from hydrogen and an alkyl group; n is an integer having a value ranging from 1 to 60; and m is a rational number having a value ranging from 0 to 10. Also disclosed are curable compositions containing such polymers, methods for making such polymers, and methods of coating and/or sealing substrates with such compositions.

22 Claims, No Drawings

POLYTHIOETHER POLYMERS AND CURABLE COMPOSITIONS CONTAINING THEM

FIELD OF THE INVENTION

The present invention is directed to polythioether polymers and curable compositions, such as coating, adhesive, and sealant compositions, comprising such polymers. The present invention is also directed to methods for coating and sealing substrates with such compositions.

BACKGROUND OF THE INVENTION

Thiol-terminated sulfur-containing compounds are known to be well-suited for use in various applications, such as aerospace sealant compositions, which is due, in large part, to their fuel-resistant nature upon cross-linking. Other desirable properties for aerospace sealant compositions include low temperature flexibility, long application time (the time during which the sealant remains usable), short curing time (the time required to reach a predetermined strength) and high-temperature resistance, among others. Sealant compositions exhibiting at least some of these characteristics and containing thiol-terminated sulfur-containing compounds are described in, for example, U.S. Pat. Nos. 2,466,963, 4,366,307, 4,609,762, 5,225,472, 5,912,319, 5,959,071, 6,172,179, 6,232,401, 6,372,849 and 6,509,418.

Nevertheless, a need in the art exists for polythioether polymers that may be used in curable compositions that can exhibit acceptable properties for aerospace compositions, such as aerospace coating or sealant compositions, while potentially having a reduced manufacturing and/or application cost as compared to prior art compositions exhibiting similar properties.

SUMMARY OF THE INVENTION

In certain respects, the present invention is directed to polymers comprising a structure comprising the formula (I):

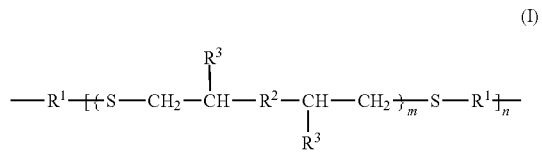

(I)

wherein,

R$^1$ in formula (I) is independently selected from a C$_{2-10}$ n-alkylene group, a C$_{2-6}$ branched alkylene group, a C$_{6-8}$ cycloalkylene group, a C$_{6-10}$ alkylcycloalkylene group, —[(—CH$_2$—)$_p$—X—]$_q$—(—CH$_2$—)$_r$—, or —[(—CH$_2$—)$_p$—X—]$_q$—(—CH$_2$—)$_r$—, wherein at least one —CH$_2$— unit is substituted with a methyl group, p is an integer having a value ranging from 2 to 6, q is an integer having a value ranging from 1 to 5, r is an integer having a value ranging from 2 to 10, and X is selected from O, S, and —NR—, wherein R is hydrogen or methyl, R$^2$ in formula (I) denotes a structure derived from an allyl (meth)acrylate or a multi-functional (meth)acrylate, R$^3$ in formula (I) is independently selected from hydrogen and an alkyl group, such as a methyl group, n in formula (I) is an integer having a value ranging from 1 to 60, and m in formula (I) is a rational number having a value ranging from 0 to 10.

In other respects, the present invention is directed to curable compositions comprising at least one polymer of the present invention.

In yet other respects, the present invention is directed to methods for making polymers of the present invention.

In other respects, the present invention is directed to methods for coating a substrate comprising: (a) applying to at least a portion of the substrate a curable composition comprising a polymer of the present invention, and (b) curing the composition.

Also, the present invention is directed to methods for sealing a substrate comprising: (a) applying to at least a portion of the substrate a curable composition comprising a polymer of the present invention, and (b) curing the composition.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural unless specifically stated otherwise. In this application, the use of "or" means "and/or" unless specifically stated otherwise.

As used herein, the term "polymer" is meant to refer to oligomers, homopolymers, and copolymers.

As used herein, the term "(meth)acrylate" and terms derived therefrom, includes both acrylates, which are represented by the structure

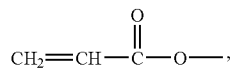

and methacrylates, which are represented by the structure

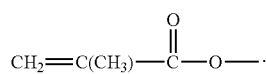

As used herein, the term "multi-functional (meth)acrylate" is intended to include materials having a structure comprising two or more (meth)acrylates.

As used herein, the term "allyl (meth)acrylate" is intended to include materials having a structure comprising a (meth)acrylate and an allyl group, which is represented by the structure $CH_2$—$CH$=$CH_2$.

As used herein, the term "alkyl" refers to a saturated or unsaturated, branched, straight-chain or cyclic monovalent hydrocarbon group derived by the removal of one hydrogen atom from a single carbon atom of a parent alkane, alkene, or alkyne.

As used herein, the term "alkylene" refers to a saturated or unsaturated, branched, straight-chain or cyclic divalent hydrocarbon group derived by the removal of two hydrogen atoms from one or two carbon atoms of a parent alkane, alkene, or alkyne. The term "alkylene" is specifically intended to include groups having any degree or level of saturation, i.e., groups having exclusively single carbon-carbon bonds, groups having one or more double carbon-carbon bonds, groups having one or more triple carbon-carbon bonds and groups having mixtures of single, double, and triple carbon-carbon bonds.

As used herein, the term "cycloalkylene" refers to a saturated or unsaturated cyclic alkylene group.

As used herein, the term "alkylcycloalkylene" refers to a cycloalkylene containing a substituted alkyl group.

As used herein, the term "thiol group" refers to the radical —SH.

As used herein, the term "olefin group" refers to a carbon-carbon double bond, C=C.

As used herein, the term "polyfunctionalizing agent" denotes a compound having more than two moieties that are reactive with terminal —SH and/or —CH=$CH_2$ groups.

The present invention is directed to polymers comprising a structure comprising the formula (I), described earlier. In certain embodiments, the present invention is directed to polymers comprising a structure comprising the formula (II):

wherein A denotes a structure comprising the formula (I), y is 0 or 1, $R^3$ denotes a single bond when y is 0 and —S—$(CH_2)_2$—$[$—O—$R^2$—$]_m$—O— (where $R^2$ and m are as described above in formula (I)) when y is 1, and $R^4$ denotes a thiol group or —S—(—$CH_2$—$)_{2+x}$—O—$R^5$ when y is 0 and —$CH$=$CH_2$ or —(—$CH_2$—$)_2$—S—$R^5$ when y is 1 (wherein x is an integer having a value ranging from 0 to 10, and $R^5$ denotes a $C_{1-6}$ n-alkyl group which is unsubstituted or substituted with at least one —OH or —NHR group, wherein R is H or a $C_{1-6}$ n-alkyl group).

Polymers in which $R^4$ in formula (II) is —SH are "uncapped" polymers that include unreacted terminal thiol groups. In certain embodiments, however, the polythioethers of the present invention are "capped" polymers, that is, the polymer includes other terminal groups, such as, for example, terminal hydroxyl groups, amine groups, siloxane groups, isocyanate groups, epoxy groups, ethylenically unsaturated groups, or alkyl groups.

In certain embodiments, the polymers of the present invention are the reaction product of (a) a first reactant comprising a compound comprising at least two reactive thiol groups, and (b) a second reactant comprising a compound comprising at least one (meth)acrylate group reactive with the thiol groups of the first reactant.

In certain embodiments, the polymers of the present invention are liquid at ambient temperature and pressure. As used herein, "ambient temperature and pressure" denotes conditions of approximately 77° F. (25° C.) and 1 atmosphere (760 mm Hg) pressure.

In certain embodiments, the polymers of the present invention are formed from a first reactant comprising at least two reactive thiol groups, i.e., a polythiol. Polythiols suitable for use in preparing the polymers of the present invention include monomeric polythiols, polymeric polythiols, or mixtures thereof. In certain cases, the polythiol material has a number average molecular weight ranging from 90 to 1000 grams per mole, such as 90 to 500 grams per mole.

For example, monomeric polythiols suitable for use in preparing polymers of the present invention include dithiols having the formula (III):

where R in formula (III) denotes a $C_{2-10}$ n-alkylene group; a $C_{2-6}$ branched alkylene group, which may have one or more pendant groups which can be, for example, hydroxyl groups, alkyl groups, such as methyl or ethyl groups, and/or alkoxy groups; a $C_{6-8}$ cycloalkylene group; a $C_{6-10}$ alkylcycloalkylene group; —$[$(—$CH_2$—$)_p$—X—$]_q$—(—$CH_2$—$)_r$—; or —$[$(—$CH_2$—$)_p$—X—$]_q$—(—$CH_2$—$)_r$ in which at least one —$CH_2$— unit is substituted with a methyl group, wherein p is an integer having a value ranging from 2 to 6, q is an integer having a value ranging from 1 to 5, r is an integer having a value ranging from 2 to 10, and X includes a heteroatom, such as O, S or another bivalent heteroatom radical; a secondary or tertiary amine group, i.e., —NR—, where R is hydrogen or methyl; or another substituted trivalent heteroatom. In certain embodiments, X is O or S, and thus R in formula (III) is —$[$(—$CH_2$—$)_p$—O—$]_q$—(—$CH_2$—$)_r$— or —$[$(—$CH_2$—$)_p$—S—$]_q$—(—$CH_2$—$)_r$—. In certain embodiments, p and r are equal, such as where p and r are both two.

Examples of specific dithiols suitable for use in preparing the polymers of the present invention include, without limitation, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methyl butane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane and mixtures thereof. The polythiol material can have one or more pendant groups selected from lower alkyl groups, lower alkoxy groups and hydroxyl groups. Suitable alkyl pendant groups include $C_1$-$C_6$ linear alkyl, $C_3$-$C_6$ branched alkyl, cyclopentyl, and cyclohexyl.

Other examples of specific dithiols suitable for use in preparing polymers of the present invention include dimercaptodiethylsulfide (DMDS) (in formula (III), R is —$[$(—$CH_2$—$)_p$—X—$]_q$—(—$CH_2$—$)_r$—, wherein p is 2, r is 2, q is 1, X is S); dimercaptodioxaoctane (DMDO) (in formula (III), R is —$[$(—$CH_2$—$)_p$—X—$]_q$—(—$CH_2$—$)_r$—, wherein p is 2, q is 2, r is 2, X is O); and 1,5-dimercapto-3-oxapentane (in formula (III), R is —$[$(—$CH_2$—$)_p$—X—$]_q$—(—$CH_2$—$)_r$—, wherein p is 2, r is 2, q is 1, X is O). It is also possible to use dithiols that include both heteroatoms in the carbon backbone and pendant alkyl groups, such as methyl groups. Such compounds include, for example, methyl-substituted DMDS, such as HS—$CH_2CH(CH_3)$—S—$CH_2CH_2$—SH, HS—$CH(CH_3)CH_2$—S—$CH_2CH_2$—SH and dimethyl substituted DMDS, such as HS—$CH_2CH(CH_3)$—S—$CH(CH_3)CH_2$—SH and HS—$CH(CH_3)CH_2$—S—$CH_2CH(CH_3)$—SH.

As mentioned previously, the polymers of the present invention may also be formed from a first reactant comprising a polymeric polythiol. For example, one or more thiol-terminated polymers prepared by reacting reactants comprising (i) one or more polyvinyl ether monomers and (ii) one or more polythiol materials, may be utilized as a reactant from which the polymers of the present invention are formed. Polythiol materials suitable for use in preparing such polymers include, for example, those polythiols identified above, including mixtures of two or more thereof.

Polyvinyl ether monomers suitable for use in preparing such polythiol polymers include, for example, divinyl ethers having the formula (IV):

(IV)

where R in formula (IV) is a $C_{2-6}$ n-alkylene group, a $C_{2-6}$ branched alkylene group, a $C_{6-8}$ cycloalkylene group, a $C_{6-10}$ alkylcycloalkylene group, or $—[(—CH_2—)_p—O—]_q—(—CH_2—)_r—$, where p is an integer having a value ranging from 2 to 6, q is an integer having a value ranging from 1 to 5, and r is an integer having a value ranging from 2 to 10.

The materials of formula (IV) are divinyl ethers. Suitable divinyl ethers include those compounds having at least one oxyalkylene group, such as from 1 to 4 oxyalkylene groups, i.e., those compounds in which m in formula (IV) is an integer from 1 to 4. In some cases, m in formula (IV) is an integer from 2 to 4. It is also possible to employ commercially available divinyl ether mixtures to produce the polythiol polymers that may be used to produce the polymers of the present invention. Such mixtures are characterized by a non-integral average value for the number of oxyalkylene units per molecule. Thus, m in formula (IV) can also take on rational number values between 0 and 10.0, such as between 1.0 and 10.0, between 1.0 and 4.0, or between 2.0 and 4.0.

Suitable polyvinyl ether monomers from which polythiol polymers may be prepared include divinyl ether monomers, such as divinyl ether, ethylene glycol divinyl ether (EG-DVE) (R in formula (IV) is ethylene and m is 1), butanediol divinyl ether (BD-DVE) (R in formula (IV) is butylene and m is 1), hexanediol divinyl ether (HD-DVE) (R in formula (IV) is hexylene and m is 1), diethylene glycol divinyl ether (DEG-DVE) (R in formula (IV) is ethylene and m is 2), triethylene glycol divinyl ether (R in formula (IV) is ethylene and m is 3), tetraethylene glycol divinyl ether (R in formula (IV) is ethylene and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and mixtures of two or more such polyvinyl ether monomers. The polyvinyl ether material can have one or more pendant groups selected from alkyl groups, hydroxyl groups, alkoxy groups and amine groups.

Useful divinyl ethers in which R in formula (IV) is $C_{2-6}$ branched alkylene can be prepared by reacting a polyhydroxy compound with acetylene. Exemplary compounds of this type include compounds in which R in formula (IV) is an alkyl-substituted methylene group such as $—CH(CH_3)—$ (for example "PLURIOL®" blends such as PLURIOL®E-200 divinyl ether (BASF Corp. of Parsippany, N.J.), for which R in formula (IV) is ethylene and m is 3.8) or an alkyl-substituted ethylene (for example $—CH_2CH(CH_3)—$ such as "DPE" polymeric blends including DPE-2 and DPE-3 (International Specialty Products of Wayne, N.J.)).

Other useful divinyl ethers include compounds in which R in formula (IV) is polytetrahydrofuryl (poly-THF) or poly-oxyalkylene, such as those having an average of about 3 monomer units.

Two or more polyvinyl ether monomers of the formula (IV) can be used. Thus, in some embodiments, two polythiols of formula (III) and one polyvinyl ether monomer of formula (IV), one polythiol of formula (III) and two polyvinyl ether monomers of formula (IV), two polythiols of formula (III) and two polyvinyl ether monomers of formula (IV), and more than two compounds of one or both formulas, can be used to produce a variety of polymeric polythiols that may be used to form the polymers of the present invention.

In some cases, the polyvinyl ether monomer comprises 20 to less than 50 mole percent of the reactants used to prepare the polythiol polymer, and, in some cases, 30 to less than 50 mole percent.

The polythiol polymers described above can be prepared by a number of methods. Relative amounts of polythiol and divinyl ether materials used to prepare the aforementioned polythiol polymers are chosen to yield terminal thiol groups. Thus, in some cases, (>n, such as n+1) moles of a polythiol having the formula (III) or a mixture of at least two different compounds having the formula (III), are reacted with (n) moles of a divinyl ether having the formula (IV) or a mixture of at least two different compounds having the formula (IV).

The reaction between the compounds of formulas (III) and (IV) may be catalyzed by a free radical catalyst. Suitable free radical catalysts include azo compounds, for example azobisnitrile compounds such as azo(bis)isobutyronitrile (AIBN); organic peroxides, such as benzoyl peroxide and t-butyl peroxide; and inorganic peroxides, such as hydrogen peroxide. The reaction can also be effected by irradiation with ultraviolet light either with or without a cationic photoinitiating moiety. Ionic catalysis methods, using either inorganic or organic bases, e.g., triethylamine, also yield useful materials.

Polythiol polymers suitable for use in preparing the polymers of the present invention may be prepared by combining at least one compound of formula (III) and at least one compound of formula (IV) followed by addition of an appropriate catalyst, and carrying out the reaction at a temperature from 30° C. to 120° C., such as 70° C. to 90° C., for a time from 2 to 24 hours, such as 2 to 6 hours.

An exemplary linear structured polythiol polymer useful in preparing the polymers of the present invention has the structure of formula (V):

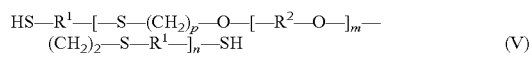
(V)

wherein, $R^1$ in formula (V) denotes a $C_{2-10}$ n-alkylene group, a $C_{2-6}$ branched alkylene group, a $C_{6-8}$ cycloalkylene group, a $C_{6-10}$ alkylcycloalkylene group, a heterocyclic group, $—[(—CH_2—)_p—X—]_q—(—CH_2—)_r—$; or $—[(—CH_2—)_p—X—]_q—(—CH_2—)_r—$ in which at least one $—CH_2—$ unit is substituted with a methyl group, wherein p is an integer having a value ranging from 2 to 6, q is an integer having a value ranging from 1 to 5, r is an integer having a value ranging from 2 to 10, and X denotes O, S, or $—NHR—$, wherein R denotes H or methyl;

$R^2$ in formula (V) denotes methylene, a $C_{2-10}$ n-alkylene group, a $C_{2-6}$ branched alkylene group, a $C_{6-8}$ cycloalkylene group, a $C_{6-14}$ alkylcycloalkylene, a heterocyclic group, or $—[(—CH_2—)_p—X—]_q—(—CH_2—)_r—$; wherein p is an integer having a value ranging from 2 to 6, q is an integer having a value ranging from 1 to 5, r is an integer having a value ranging from 2 to 10, and X denotes O, S, or $—NHR—$, wherein R denotes H or methyl;

m in formula (V) is a rational number having a value ranging from 1 to 50;

n in formula (V) is an integer having a value ranging from 1 to 60; and p in formula (V) is an integer having a value ranging from 2 to 6.

Thus, in certain embodiments, the polythiol polymer that is used to prepare the polymers of the present invention has the structure of formula (VI):

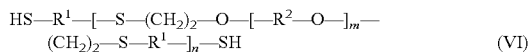

wherein $R^1$, $R^2$, m, and n are as described above with reference to formula (V). In certain embodiments, $R^1$ in formula (VI) is —[(—CH$_2$—)$_p$—X—]$_q$—(—CH$_2$—)$_r$—, where p is 2, X is O, q is 2, r is 2, $R^2$ is ethylene, m is 2, and n is 9.

In certain embodiments, the polythiol polymers used to prepare the polymers of the present invention are essentially free, or free, of sulfone, ester or disulfide linkages. As used herein, "essentially free of sulfone, ester or disulfide linkages" means that less than 2 mole percent of the linkages in the thiol-terminated polymer are sulfone, ester or disulfide linkages.

As mentioned earlier, in certain embodiments, the polymers of the present invention comprise the reaction product of a second reactant comprising a compound comprising at least one (meth)acrylate group reactive with the thiol groups of the first reactant. More particularly, in certain embodiments, the second reactant is selected from allyl (meth)acrylate, a multi-functional (meth)acrylate, or a mixture thereof.

Multi-functional acrylates suitable for use in preparing the polymers of the present invention include, without limitation, difunctional, trifunctional, tetrafunctional, pentafunctional, and hexafunctional (meth)acrylates, including mixtures thereof. Representative examples of suitable multi-functional (meth)acrylates include, without limitation, ethylene glycol di(meth)acrylate, 1,3-butylene glycol di(meth)acrylate, 1,4-butanediol di(meth)acrylate, 2,3-dimethylpropane 1,3-di(meth)acrylate, 1,6-hexanediol di(meth)acrylate, propylene glycol di(meth)acrylate, dipropylene glycol di(meth)acrylate, tripropylene glycol di(meth)acrylate, tetrapropylene glycol di(meth)acrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, polyethylene glycol di(meth)acrylate, polybutadiene di(meth)acrylate, tripropylene glycol di(meth)acrylate, thiodiethylene glycol di(meth)acrylate, trimethylene glycol di(meth)acrylate, triethylene glycol di(meth)acrylate, alkoxylated hexanediol di(meth)acrylate, alkoxylated neopentyl glycol di(meth)acrylate, pentanediol di(meth)acrylate, pentaerythritol tri(meth)acrylate, pentaerythritol tetra(meth)acrylate, trimethylolpropane tri(meth)acrylate, ditrimethylolpropane tetra(meth)acrylate, glycerol tri(meth)acrylate, glycerolpropoxy tri(meth)acrylate, ethoxylated trimethylolpropane tri(meth)acrylate, tetraethylene glycol di(meth)acrylate, and dipentaerythritol penta(meth)acrylate, including mixtures thereof.

Polymers of the present invention may be prepared by a number of methods. In certain embodiments, (>n, such as n+1) moles of a polythiol, such as the monomeric or polymeric thiols described earlier, or a mixture of at least two different polythiols, are reacted with (n) moles of a reactant comprising a compound comprising at least one (meth)acrylate group, or a mixture of at least two different compounds comprising at least one (meth)acrylate group, in the presence of an appropriate catalyst. This method affords an uncapped, thiol-terminated polyfunctional polymer.

As indicated earlier, certain embodiments of the present invention comprise "capped" polymers. Thus, in certain embodiments of the present invention, analogs to the foregoing polymers are prepared by reacting (i) (>n, such as n+1) moles of a polythiol, such as the monomeric or polymeric thiols described earlier, or a mixture of at least two different polythiols, with (ii) (n) moles of a reactant comprising a compound comprising at least one (meth)acrylate group, or a mixture of at least two different compounds comprising at least one (meth)acrylate group, and (iii) 0.05 to 2 moles of a compound having the formula (VII)

or a mixture of at least two different compounds having the formula (VII), in the presence of an appropriate catalyst. In formula (VII), R denotes $C_{1-6}$ n-alkyl which is unsubstituted or substituted with at least one —OH or —NHR group, wherein R denotes H or a $C_{1-6}$ n-alkyl group.

Compounds of the formula (VII) are alkyl ω-alkenyl ethers (ethers having a terminal ethylenically unsaturated group), which react with terminal thiol groups to cap the polymer. Use of 2 moles of compounds of formula (VII) affords fully capped polymers, while use of lesser amounts results in partially capped polymers.

In formula (VII), s is an integer having a value ranging from 0 to 10, such as 0 to 6 or, in some cases, 0 to 4. Specific examples of suitable compounds having the formula (VII) are monovinyl ether (s is 0), including amino- and hydroxyalkyl vinyl ethers, such as 3-aminopropyl vinyl ether and 4-hydroxybutyl vinyl ether (butanediol monovinyl ether), as well as unsubstituted alkyl vinyl ethers, such as ethyl vinyl ether. Other examples of compounds of formula (VII) include allyl ethers (s is 1), such as 4-aminobutyl allyl ether, 3-hydroxypropyl allyl ether, etc.

In certain embodiments of the present invention, (n) moles of a polythiol, such as the monomeric or polymeric thiols described earlier, or a mixture of at least two different polythiols, are reacted with (>n, such as n+1) moles of a reactant comprising a compound comprising at least one (meth)acrylate group, or a mixture of at least two different compounds comprising at least one (meth)acrylate group, in the presence of an appropriate catalyst. This method affords vinyl-terminated polyfunctional polymers.

In certain embodiments of the present invention, analogs to the foregoing vinyl-terminated polymers are prepared by reacting (i) (n) moles of a polythiol, such as the monomeric or polymeric thiols described earlier, or a mixture of at least two different polythiols, with (ii) (>n, such as n+1) moles of a reactant comprising a compound comprising at least one (meth)acrylate group, or a mixture of at least two different compounds comprising at least one (meth)acrylate group, and (iii) 0.05 to 2 moles of a compound having the formula (VII)

or a mixture of at least two different compounds having the formula (VIII), in the presence of an appropriate catalyst. In formula (VIII), R denotes $C_{1-6}$ n-alkyl which is unsubstituted or substituted with at least one —OH or —NHR group, wherein R denotes H or a $C_{1-6}$ n-alkyl group.

Compounds of formula (VIII) are monothiols, which can be unsubstituted or substituted with, for example, hydroxyl or amino groups. Exemplary compounds of formula (VIII) include mercaptoalcohols, such as 3-mercaptopropanol, and mercaptoamines, such as 4-mercaptobutylamine.

As should be apparent from the foregoing description, the polymers of the present invention comprise a structure comprising the formula (I), described above.

In certain embodiments, $R^2$ in formula (I) denotes a moiety derived from a compound comprising two acrylate groups, i.e., a di(meth)acrylate. Certain embodiments of the present invention, therefore, are directed to polymers wherein $R^2$ in formula (I) denotes a structure of formula (IX):

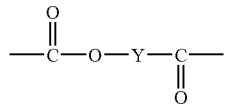
(IX)

wherein Y denotes

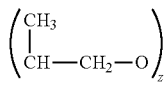

or $(CH_2)_wO$, wherein u is an integer having a value ranging from 1 to 4, y is an integer having a value ranging from 1 to 3, z is an integer having a value ranging from 1 to 4, and w is an integer having a value ranging from 1 to 12.

In certain embodiments, $R^2$ in formula (I) denotes a moiety derived from allyl (meth)acrylate. Certain embodiments of the present invention, therefore, are directed to polymers wherein $R^2$ in formula (I) denotes a structure of formula (X):

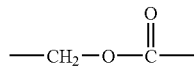
(X)

As should be apparent to those skilled in the art based on the foregoing description, in certain embodiments, the polymers of the present invention comprise a difunctional thiol-terminated (uncapped) polythioether. In these embodiments, the polymer has the structure of formula (XI):

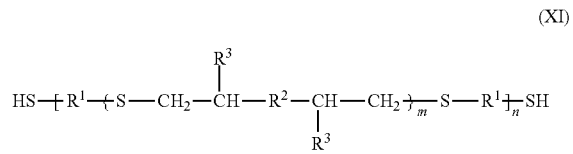
(XI)

wherein $R^1$, $R^2$, $R^3$, m and n in formula (XI) are as described above with respect to formulas (I). In certain embodiments, such polymers are capped by replacing the terminal —SH groups with —S—(—CH$_2$—)$_{2+x}$—O—R, where R denotes $C_{1-6}$ n-alkyl which is unsubstituted or substituted with at least one —OH or —NHR group, wherein R denotes H or a $C_{1-6}$ n-alkyl group, and x is an integer having a value ranging from 0 to 10. Such caps may be produced by reaction of the terminal thiol group with an ω-alkenyl ether, such as monovinyl ether, by including in the reaction mixture a capping agent or mixture thereof, as described in detail earlier.

As should also be apparent to those skilled in the art, in certain embodiments, the polymers of the present invention comprise a difunctional vinyl-terminated polythioether. In these embodiments, the polymer has the structure of formula (XII):

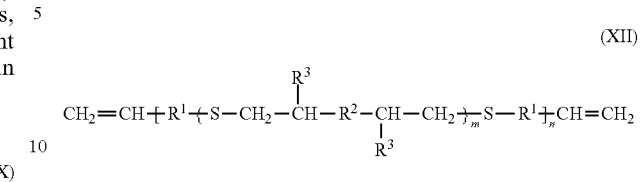
(XII)

where $R^1$, $R^2$, $R^3$, m and n in formula (XII) are as described above with respect to formulas (I). In certain embodiments, the terminal —CH=CH$_2$ groups are replaced with —C—CH$_2$—R, where R denotes $C_{1-6}$ n-alkyl which is unsubstituted or substituted with at least one —OH or —NHR group, wherein R denotes H or a $C_{1-6}$ n-alkyl group. Such caps may be produced by reaction of the terminal olefin group with a monothiol, such as a mercaptoalcohol or mercaptoamine, by including in the reaction mixture a capping agent or a mixture of two or more thereof, as described in detail earlier.

In certain embodiments, as just indicated, the polymers of the present invention comprise a linear polythioether having a functionality of 2 (considering alkyl and other non-reactive caps within this total). If desired, however, polythioethers having higher functionality can be prepared from such polymers by using a polyfunctionalizing agent. The polyfunctionalizing agent may, for example, include from 3 to 6 such moieties, and may be denoted a "z-valent" polyfunctionalizing agent, where z is the number of such moieties included in the agent, and hence the number of separate branches which the polymer comprises. Such polyfunctionalizing agents can be represented by the formula (XIII)

(XIII)

where R in formula (XIII) denotes a moiety that is reactive with terminal —SH or —CH=CH$_2$ and can be the same or different, and B is the z-valent residue of the polyfunctionalizing agent, i.e., the portion of the agent other than the reactive moieties.

As a result, certain embodiments of the present invention are directed to polymers comprising a structure comprising the formula (XIV):

(XIV)

wherein B in formula (XIV) denotes a z-valent residue of a polyfunctionalizing agent, A denotes a structure having the formula (I) described earlier, y is 0 or 1, z is an integer having a value ranging from 3 to 6, $R^3$ denotes a single bond when y is 0 and —S—(CH$_2$)$_2$—[O—R$^2$—]$_m$—O— (where $R^2$ and m are as described above in formula (I)) when y is 1, and $R^4$ denotes —SH or —S—(—CH$_2$—)$_{2+x}$—O—R$^5$ when y is 0 and —CH=CH$_2$ or —(—CH$_2$—)$_2$—S—R$^5$ when y is 1 (wherein x is an integer having a value ranging from 0 to 10, and $R^5$ denotes a $C_{1-6}$ n-alkyl group which is unsubstituted or substituted with at least one —OH or —NHR group, wherein R is H or a $C_{1-6}$ n-alkyl group).

As with the difunctional polymers described earlier, the foregoing polymers having a functionality of greater than 2 can include terminal thiol groups or —CH=CH$_2$ groups, or terminal —S—(—CH$_2$—)$_{2+x}$—O—R or —C—CH$_2$—R groups, wherein x is an integer having a value ranging from 0 to 10 and R denotes $C_{1-6}$ n-alkyl which is unsubstituted or substituted with at least one —OH or —NHR group, wherein R denotes H or a $C_{1-6}$ n-alkyl group. Partially capped polymers, i.e., polymers in which some, but not all, of the branches are capped, are also within the scope of the present invention.

Specific polyfunctionalizing agents suitable for use in the present invention include trifunctionalizing agents, that is, compounds where z is 3. Suitable trifunctionalizing agents include triallyl cyanurate (TAC), wherein R in formula (XIII) is allyl, and 1,2,3-propanetrithiol, wherein R in formula (XIII) is thiol. In certain embodiments, the polyfunctionalizing agent comprises a polyfunctional (meth)acrylate comprising at least three (meth)acrylate groups, such as any of the trifunctional, tetrafunctional, pentafunctional, and hexafunctional (meth)acrylates that were identified earlier, including mixtures thereof.

Other useful polyfunctionalizing agents include trimethylolpropane trivinyl ether, and the polythiols described in U.S. Pat. No. 4,366,307 at col. 4, lines 6 to 23, and col. 6, lines 18 to 55; U.S. Pat. No. 4,609,762 at col. 8, line 60 to col. 9, line 55; and U.S. Pat. No. 5,225,472 at col. 4, lines 8 to 32, the disclosures of each of which are incorporated herein by reference. Mixtures of polyfunctionalizing agents can also be used.

As a result, certain polymers of the present invention can have a wide range of average functionality. For example, trifunctionalizing agents can afford average functionalities from about 2.05 to 3.0, such as 2.1 to 2.6. Wider ranges of average functionality can be achieved by using tetrafunctional or higher functionality polyfunctionalizing agents. Functionality can also be affected by factors such as stoichiometry, as will be understood by those skilled in the art.

The polymers of the present invention having a functionality of greater than 2 can be prepared similarly to the difunctional polymers described earlier. In certain embodiments, such polymers are prepared by combining (i) one or more polythiols, such as the monomeric or polymeric thiols described earlier, with (ii) one or more compounds comprising at least one and no more than two (meth)acrylate groups, and (iii) a polyfunctionalizing agent, and reacting the mixture. Thus, in accordance with certain embodiments of the present invention, (>n, such as n+1) moles of one or more polythiols, (n) moles of one or more compounds comprising at least one and no more than two (meth)acrylate groups, and one or more z-valent polyfunctionalizing agents, are combined to form a reaction mixture. The mixture is then reacted, possibly in the presence of a suitable catalyst, to afford thiol-terminated polymers. Capped analogs of such polymers may be prepared by inclusion in the reaction mixture of 0.05 to 2 moles of one or more appropriate capping compounds, such as those described earlier with reference to formula (VII).

In certain embodiments, (n) moles of a one or more polythiols, (>n, such as n+1) moles of one or more compounds comprising at least one and no more than two (meth)acrylate groups, and one or more z-valent polyfunctionalizing agents, are combined to form a reaction mixture and then reacted as described above to afford olefin-terminated polyfunctional polymers. Capped analogs of such polymers may be prepared by inclusion in the reaction mixture of one or more appropriate capping compounds, such as those described earlier with reference to formula (VIII).

The polymers of the present invention may be prepared by combining one or more polythiols and one or more compounds comprising at least one (meth)acrylate group, optionally together with one or more capping compounds and/or one or more polyfunctionalizing agents, followed by the addition of an appropriate catalyst, and carrying out the reaction at a temperature from 25° to 120° C. for a time from 2 to 24 hours. In some cases, the reaction may be carried out at a temperature from 70° to 90° C. for a time from 2 to 6 hours.

Suitable catalysts include either inorganic or organic bases, such as triethylamine, and 1,8-diazabicyclo[5.4.0]undec-7-ene (DBU). In certain cases, azo compounds, such as azobisnitrile compounds, such as AIBN; organic peroxides, such as benzoyl peroxide and t-butyl peroxide; and inorganic peroxides, such as hydrogen peroxide, may be used.

In certain embodiments, a free-radical inhibitor may also be used to prevent premature free-radical polymerization of one or more of the reactants. Any free-radical inhibitor may be utilized, including phenolic inhibitors, such as 4-methoxyphenol, 4-ethoxyphenol, 2,6-ditertiary-butyl-para-cresol, and the like or quinonic inhibitors such as quinone, 2-methylquinone, methylhydroquinone, and the like. In certain embodiments, the inhibitor, if present, comprises from 0.01 percent to 5 percent by weight of the reactants.

In certain embodiments, prior to cure, the polymers of the present invention may be ungelled or substantially free of crosslinking. By "ungelled" is meant that the polymer is substantially free of crosslinking and has an intrinsic viscosity when dissolved in a suitable solvent, as determined, for example, in accordance with ASTM-D1795 or ASTM-D4243. The intrinsic viscosity of the polymer is an indication of its finite molecular weight. A gelled reaction product, on the other hand, since it is of essentially infinitely high molecular weight, will have an intrinsic viscosity too high to measure.

In certain embodiments, the polymers of the present invention have a glass transition temperature (Tg) that is not higher than −50° C., such as not higher than −55° C. and, in some case, not higher than −60° C. In certain embodiments, the Tg of the polymers of the present invention ranges from −85° C. to −50° C., such as −70° C. to −50° C. The Tg values reported herein are determined by differential scanning calorimetry (DSC).

In certain embodiments, the polymers of the present invention have a number average molecular weight ranging from 500 to 20,000 grams per mole, such as 1,000 to 10,000 grams per mole, or, in some cases, 2,000 to 5,000 grams per mole, the molecular weight being determined by gel-permeation chromatography using a polystyrene standard.

In certain embodiments, the polymers of the present invention have a viscosity of less than 500 poise, such as less than 300 poise, at a temperature of 25° C. and a pressure of about 760 mmHg as determined according to ASTM D-2849 §79-90 using a Brookfield viscometer.

The polymers of the present invention can be useful in a wide variety of applications, including as a component in coating, adhesive, and/or sealant compositions, such as curable compositions in applications where low temperature flexibility and fuel resistance are important. Such curable compositions can be useful in aerospace applications, such as aerospace sealants and linings for fuel tanks. Thus, the present invention is also directed to curable compositions comprising at least one polymer of the present invention.

In certain embodiments, the polymers of the present invention are present in such curable compositions in an amount from 30 weight percent to 90 weight percent, such as 40 to 80 weight percent, or, in some cases, 45 to 75 weight percent, with weight percent being based on the weight of all non-volatile components of the curable composition.

In certain embodiments, the curable compositions of the present invention also comprise a curing agent comprising at least two reactive groups reactive with the reactive groups of the polymer. For example, when the polymer of the present invention that is included in the curable composition comprises reactive thiol groups, as described earlier, suitable curing agents may include one or more polyolefins, polyacrylates, metal oxides, polyepoxides, or a mixture thereof. Curing agents useful in curable compositions of the present invention, particularly in those embodiments wherein the polymer comprises reactive thiol groups, include polyepoxides or epoxy functional resins, for example, hydantoin diepoxide, bisphenol-A epoxides, bisphenol-F epoxides, novolac type epoxides, aliphatic polyepoxides, and any of the epoxidized unsaturated and phenolic resins. Other useful curing agents include unsaturated compounds, such as (meth) acrylic esters of commercially available polyols, unsaturated synthetic or naturally occurring resin compounds, TAC, and olefinic terminated polymers of the present invention. Useful cures can also be obtained through oxidative coupling of the thiol groups using organic or inorganic peroxides (e.g., $MnO_2$) known to those skilled in the art. Selection of the particular curing agent may affect the Tg of the cured composition. For example, curing agents that have a Tg significantly lower than the Tg of the polymer may lower the Tg of the cured composition.

Depending on the nature of the polymer(s) used in the curable compositions of the present invention, the composition may, in certain embodiments, comprise 90 percent to 150 percent, such as 95 percent to 125 percent, of the stoichiometric amount of the selected curing agent(s) based upon —SH equivalents.

In certain embodiments, the curable compositions of the present invention also comprise at least one filler. Fillers may, if desired, be added to the curable compositions of the present invention to, for example, impart impact resistance, control the viscosity of the composition, modify the electrical properties of the composition, or control the specific gravity of the composition. Fillers suitable for use in the curable compositions of the present invention include, for example, carbon black, calcium carbonate, silica, and polymer powders. Exemplary fillers include Sipernat® D-13 hydrophobic precipitated silica (Degussa), Winnofil® SPM precipitated calcium carbonate (Solvay Chemicals), TS-270 (Cabot Corp.), titanium dioxide (DuPont), aluminum hydroxide, and Orgasol® 1002 D Nat 1 ultrafine polyamide powder (Atofina Chemicals). In certain embodiments, the curable composition comprises 5 to 70 weight percent of filler based on the total weight of the curable composition.

In certain embodiments, the curable compositions of the present invention may also comprise one or more adhesion promoters. Suitable adhesion promoters include phenolics, such as METHYLON phenolic resin available from Occidental Chemicals, organosilanes, including epoxy, mercapto, or amino functional silanes, such as A-187 and A-1100 commercially available from OSi Specialties. In certain embodiments, an adhesion promoter is employed in an amount ranging from 0.1 to 15 weight percent based on the total weight of the curable composition.

In certain embodiments, the curable compositions of the present invention also comprise a plasticizer. Suitable plasticizers include phthalate esters, chlorinated paraffins, and hydrogenated terphenyls, among others. Examples of useful plasticizers include HB-40® modified polyphenyl (Solutia, Inc.) and tung oil (Campbell & Co.). The plasticizer, if present, may, in certain embodiments, comprise from 1 to 40 weight percent, such as 1 to 8 weight percent, based on the total weight of the curable composition.

In certain embodiments, the curable composition also comprises one or more organic solvents, such as isopropyl alcohol, among others. In certain embodiments, such solvents may be present in an amount of up to 15 weight percent, such as less than 15 weight percent, or less than 10 weight percent, with weight percent being based on the total weight of the curable composition.

In addition to the foregoing ingredients, the curable compositions of the present invention may optionally include one or more of the following: pigments; thixotropes; accelerators; retardants; and masking agents. Useful pigments include carbon black, calcium carbonate, and metal oxide, among others. In certain embodiments, such pigments comprise from 0.1 to 10 weight percent based on the total weight of the curable composition. Useful thixotropes include, for example, fumed silica and carbon black, and, in certain embodiments, comprise 0.1 to 5 weight percent based on the total weight of the curable composition.

The curable compositions of the present invention may be applied to any suitable substrate. Common substrates to which the curable compositions of the present invention are applied can include titanium, stainless steel, aluminum, anodized, primed, organic coated and chromate coated forms thereof, epoxy, urethane, graphite, fiberglass composite, KEVLAR®, acrylics and polycarbonates, among others.

The present invention is also directed to methods for sealing or coating a substrate comprising: (a) applying to at least a portion of the substrate a curable composition, and (b) curing the composition. In these methods, the curable composition comprises a curable composition of the present invention.

According to the methods of the present invention, the curable composition is cured. As used herein, the term "cure" means that any crosslinkable components of the curable composition are at least partially crosslinked. In certain embodiments, the crosslink density of the crosslinkable components, i.e., the degree of crosslinking, ranges from 5% to 100% of complete crosslinking, such as 35% to 85% of complete crosslinking. For sealant compositions, for example, the extent of cure can be estimated by determining the extrusion rate of the composition as a function of time. The extrusion rate is the rate at which a mixed sealant formulation, i.e., a sealant formulation together with an accelerator system, is extruded from an applicator device. As the sealant formulation is mixed with the accelerator system, curing begins, and the extrusion rate changes with time. The extrusion rate thus is inversely related to the extent of cure. When the extent of cure is low, the viscosity of the mixed ungelled sealant formulation is low and thus the extrusion rate is high. When the reaction approaches completion, the viscosity becomes very high, and the extrusion rate thus becomes low. The extrusion rate can be measured according to AMS Method 3276 (section 4.5.10).

In certain embodiments of the methods of the present invention, the curable composition is cured at a temperature ranging from 0° C. to 100° C.

In certain embodiments of the methods of the present invention, the curable composition is cured by exposing the composition to an energy source. In certain embodiments, such as when the curable composition comprises a polymer of the present invention that comprises reactive ethylenically unsaturated groups, such as olefin groups, the curable composition may be radiation-curable. As used herein, the term "radiation-curable" refers to materials having reactive components that are polymerizable by exposure to an energy source, such as an electron beam (EB), UV light, or visible light.

Therefore, in certain embodiments, the curable compositions of the present invention may be cured by exposure to ionizing radiation and/or ultraviolet light. Ionizing radiation is radiation having an energy at least sufficient to produce ions either directly or indirectly in a medium composed of common materials such as air or water, and includes, for example, accelerated electrons as produced by generally known electron beam devices. When electron beam devices are used to cure a composition of the invention, the energy of the accelerated electrons typically ranges from about 100,000 electron volts to about 300,000 electron volts. The amount of ionizing radiation in rads for curing a composition of the invention will vary depending on the such factors as the particular formulation of the curable composition, thickness of the applied layer of curable composition on the substrate, temperature of the composition, and the like. However, in certain embodiments, the curable compositions of the invention can be cured at low doses of electron beam radiation.

Ultraviolet radiation from any suitable source which emits ultraviolet light having a wavelength ranging from, for example, 180 to 400 nanometers, may be employed to cure certain curable compositions of the invention. Suitable sources of ultraviolet light are generally known and include, for example, mercury arcs, carbon arcs, low pressure mercury lamps, medium pressure mercury lamps, high pressure mercury lamps, swirl-flow plasma arcs and ultraviolet light emitting diodes. Certain embodiments of the curable compositions of the invention can exhibit an excellent degree of cure in air at relatively low energy exposure in ultraviolet light.

In certain embodiments, particularly when the polymer(s) present in the curable composition is to be cured by UV radiation, the curable compositions of the present invention also comprise a photoinitiator. As will be appreciated by those skilled in the art, a photoinitiator absorbs radiation during cure and transforms it into chemical energy available for the polymerization. Photoinitiators are classified in two major groups based upon a mode of action, either or both of which may be used in the compositions of the present invention. Cleavage-type photoinitiators include acetophenones, α-aminoalkylphenones, benzoin ethers, benzoyl oximes, acylphosphine oxides and bisacylphosphine oxides and mixtures thereof. Abstraction-type photoinitiators include benzophenone, Michler's ketone, thioxanthone, anthraquinone, camphorquinone, fluorone, ketocoumarin and mixtures thereof.

Specific nonlimiting examples of photoinitiators that may be used in the curable compositions of the present invention include benzil, benzoin, benzoin methyl ether, benzoin isobutyl ether benzophenol, acetophenone, benzophenone, 4,4'-dichlorobenzophenone, 4,4'-bis(N,N'-dimethylamino)benzophenone, diethoxyacetophenone, fluorones, e.g., the H-Nu series of initiators available from Spectra Group Ltd., 2-hydroxy-2-methyl-1-phenylpropan-1-one, 1-hydroxycyclohexyl phenyl ketone, 2-isopropylthixantone, α-aminoalkylphenone, e.g., 2-benzyl-2-dimethylamino-1-(4-morpholinophenyl)-1-butanone, acylphosphine oxides, e.g., 2,6-dimethylbenzoyldlphenyl phosphine oxide, 2,4,6-trimethylbenzoyldiphenylphosphine oxide, bis(2,4,6-trimethylbenzoyl)phenyl phosphine oxide, 2,6-dichlorobenzoyldiphenylphosphine oxide, and 2,6-dimethoxybenzoyldiphenylphosphine oxide, bisacylphosphine oxides, e.g., bis(2,6-dimethyoxybenzoyl)-2,4,4-trimethylpentylphosphine oxide, bis(2,6-dimethylbenzoyl)-2,4,4-trimethylpentylphosphine oxide, bis(2,4,6-trimethylbenzoyl)-2,4,4-trimethylpentylphosphine oxide, and bis(2,6-dichlorobenzoyl)-2,4,4-trimethylpentylphosphine oxide, and mixtures thereof.

In certain embodiments, the curable compositions of the present invention comprise 0.01 up to 15 percent by weight of photoinitiator or, in some embodiments, 0.01 up to 10 percent by weight, or, in yet other embodiments, 0.01 up to 5 percent by weight of photoinitiator based on the total weight of the curable composition.

When cured, certain embodiments of the curable compositions of the present invention can exhibit good low temperature flexibility as determined by known methods, for example, the methods described in AMS (Aerospace Material Specification) 3267 §4.5.4.7, MIL-S (Military Specification) -8802E §3.3.12 and MIL-S-29574, and by methods similar to those described in ASTM (American Society for Testing and Materials) D522-88, which are incorporated herein by reference.

In certain embodiments, the curable compositions of the present invention exhibit very desirable fuel resistance characteristics when cured, due at least in part to the use of the polymers discussed herein. The fuel resistance of a cured composition can be determined by percent volume swell after prolonged exposure of the cured composition to a hydrocarbon fuel, which can be quantitatively determined using methods similar to those described in ASTM D792 or AMS 3269, which are incorporated herein by reference. For fuel resistance testing, the cured composition can be prepared from 100 parts by weight of thiol-terminated polymer, 50 parts by weight of precipitated calcium carbonate and an epoxy curing agent in a 1:1 equivalent ratio of mercapto groups to epoxy groups. The epoxy curing agent is prepared from a 60:40 weight ratio of EPON 828 bisphenol A diglycidyl ether (available from Shell Chemical) to DEN 431 bisphenol A novolac resin (available from Dow Chemical).

In certain embodiments of the present invention, the cured composition exhibits a percent volume swell not greater than 40%, such as not greater than 25% or, in some cases, not greater than 20%, after immersion for one week at 140° F. (60° C.) and ambient pressure in jet reference fluid (JRF) type 1. Jet reference fluid JRF type 1, as employed herein for determination of fuel resistance, has the following composition (see AMS 2629, issued Jul. 1, 1989), §3.1.1 et seq., available from SAE (Society of Automotive Engineers, Warrendale, Pa.) (that is incorporated herein by reference):

| Toluene | 28 ± 1% by volume |
|---|---|
| Cyclohexane (technical) | 34 ± 1% by volume |
| Isooctane | 38 ± 1% by volume |
| Tertiary dibutyl disulfide (doctor sweet) | 1 ± 0.005% by volume |
| Tertiary butyl mercaptan | 0.015% ± 0.0015 by weight of the other four components |

Illustrating the invention are the following examples, which, however, are not to be considered as limiting the invention to their details. Unless otherwise indicated, all parts and percentages in the following examples, as well as throughout the specification, are by weight.

EXAMPLES

Example 1

A 3-liter four-necked, round-bottomed flask equipped with a thermometer, mechanical stirrer, nitrogen gas inlet and addition funnel was charged with 981.24 grams (5.38 moles) of dimercaptodioxaoctane (DMDO) and 47.18 grams (0.19 mole) of triallyl cyanurate (TAC). The flask was purged with nitrogen and contents were heated under stirring at 70° C. for 5 hours. The reaction mixture was cooled to room temperature and mixed with 1.00 g of 1,8-diazabicyclo[5.4.0]undec-7-ene (DBU) and 100 ml of ethanol. Under stirring and cooling with a water bath, 971.60 grams (4.54 moles) of diethylene glycol diacrylate (DEG-DA) was introduced into the flask over 8 hours. The reaction mixture was stirred at room temperature for 3 hours and heated at 70° C. for 5 hours. Evacuation of the reaction mixture at 70° C./7-8 mmHg for 2 hours provided a liquid polymer of off-white color. The polymer yield was 2000 grams (100%). The polymer had a viscosity of 156 poise at a temperature of 25° C. and a pressure of about 760 mmHg as determined according to ASTM D-2849 §79-90 using a Brookfield viscometer, a Tg of −48° C. determined by differential scanning calorimetry, and a number average molecular weight of 3376 as determined by gel-permeation chromatography using a polystyrene standard.

Example 2

A 1-liter four necked, round-bottomed flask equipped with a thermometer, mechanical stirrer, nitrogen gas inlet and addition funnel was charged with 369.16 grams (2.02 moles) of DMDO and 17.71 grams (0.07 mole) of TAC. The flask was purged with nitrogen and the contents were heated under stirring at 70° C. for 3 hours. The reaction mixture was cooled to room temperature and mixed with 0.8 grams of 4-methoxyphenol, 0.4 grams of DBU and 40 milliliters of ethanol. Under stirring and cooling with a water bath, 413.13 grams (1.71 moles) of diethylene glycol dimethacrylate (DEG-DMA) was introduced into the flask over 7 hours. The reaction mixture was stirred at room temperature for 4 hours and heated at 70° C. for 6 hours. Evacuation of the reaction mixture at 70° C./7-8 mmHg for 2 hours provided a liquid polymer of off-white color. The polymer yield was 800 grams (100%). The polymer had a viscosity of 252 poise at a temperature of 25° C. and a pressure of about 760 mmHg as determined according to ASTM D-2849 §79-90 using a Brookfield viscometer, a Tg of −51° C. determined by differential scanning calorimetry, and a number average molecular weight of 4039 as determined by gel-permeation chromatography using a polystyrene standard.

Example 3

A 100-milliliter four-necked, round-bottomed flask equipped with a thermometer, mechanical stirrer, nitrogen gas inlet and addition funnel was charged with 36.66 grams (0.2 moles) of DMDO, 0.06 grams of 4-methoxyphenol, 0.03 grams of DBU and 3 milliliters of ethanol. Under stirring and cooling with a water bath, 21.75 grams (0.17 mole) of allyl methacrylate (AMA) was introduced into the flask over 1.5 hours. The reaction mixture was stirred at room temperature for 8 hours and heated at 70° C. for 4.5 hours. Ethanol was removed under vacuum and 1.59 grams (0.006 mole) of TAC was added into the reaction mixture. The flask was purged with nitrogen and contents were heated to 70° C. Nine portions (0.036 g each) of free radical initiator Vazo®67 [Du Pont's 2,2'-azobis(2-methylbutyronitrile)] were added after every 2 hours to complete the reaction. Evacuation of the reaction mixture at 70° C./7-8 mmHg for 0.5 hour provided a light amber liquid polymer. The polymer yield was 60 grams (100%). The polymer had a viscosity of 319 poise at a temperature of 25° C. and a pressure of about 760 mmHg as determined according to ASTM D-2849 §79-90 using a Brookfield viscometer, a Tg of −59° C. determined by differential scanning calorimetry, and a number average molecular weight of 4644 as determined by gel-permeation chromatography using a polystyrene standard.

Example 4

A sealant composition was prepared by combining 85 parts by weight of the polymer of Example 1, 15 parts by weight of PERMAPOL P5 polymer (commercially available from PRC-DeSoto International, Glendale, Calif.), 1.5 parts by weight Methylon 75108 resin (commercially available from Resolution Performance Products, Houston, Tex.), 1.0 parts by weight of a phenolic resin adhesion promoter, 1.0 parts by weight titanium dioxide, 5 parts by weight aluminum hydroxide, 50 parts by weight calcium carbonate, 0.5 parts by weight Tyzor® TPT (commercially available from E.I. DuPont de Nemours and Co., Wilmington, Del.), 2.0 parts by weight A-1100 amino silane (commercially available from OSi Specialties, Inc., Greenwich, Conn.), 1.0 parts by weight A-1120 amino silane (commercially available from OSi Specialties, Inc., Greenwich, Conn.), 0.8 parts by weight Dabco 33LV (triethylenediamine in dipropylene glycol, commercially available from Air Products & Chemicals), and 0.5 parts by weight tung oil.

A summary of the properties of the composition of Example 4 is presented in Table 1.

TABLE 1

| Property | Example 4 |
| --- | --- |
| Viscosity[1] | 13,500 poise |
| Flow[2] | |
| 30 minutes | 0.2 inches |
| 50 minutes | 0.2 inches |
| 90 minutes | 0.2 inches |
| Application Time after 2 hours[3] | 72 grams/minute |
| Tack Free Time[4] | <24 hours |
| Cure Hardness[5] | |
| 1 day | 20 rex |
| 2 days | 42 rex |
| 3 days | 50 rex |
| Adhesion[6] | |
| Alodine 1200 (Dry, 7 days) | 44 lbf/in (99% CF) |
| Alodine 1200 (NaCl, 140° F., 7 days) | 36 lbf/in (100% CF) |
| Alodine 1200 (JRF-1, 140° F., 7 days) | 29 lbf/in (100% CF) |
| SA Anodized (Dry, 7 days) | 43 lbf/in (100% CF) |
| SA Anodized 1200 (NaCl, 140° F., 7 days) | 35 lbf/in (100% CF) |
| SA Anodized (JRF-1, 140° F, 7 days) | 29 lbf/in (100% CF) |
| Mil C (Dry, 7 days) | 42 lbf/in (100% CF) |
| Mil C (NaCl, 140° F., 7 days) | 34 lbf/in (100% CF) |
| Mil C (JRF-1, 140° F., 7 days) | 31 lbf/in (100% CF) |
| Tensile (Dry)[7] | 350 psi |
| Tensile (JRF-1, 140° F., 17 days) | 320 psi |
| Tensile (NaCl, 140° F., 17 days) | 280 psi |
| Elongation (Dry) | 275% |
| Elongation (JRF-1, 140° F., 17 days) | 200% |
| Elongation (NaCl, 140° F., 17 days) | 300% |

[1]Viscosity was measured in accordance with the procedure described in AMS (Aerospace Material Specification) 3265B, §3.6.3, test procedure AS5127/1 (for Class B sealing compounds), § 5.3.
[2]Flow was measured in accordance with the procedure described in AMS 3265B, § 3.6.5, test procedure AS5127/1, § 5.5.1.
[3]Application time was measured in accordance with the procedure described in AMS 3265B, § 3.6.6, test procedure AS5127/1, § 5.6.2.
[4]Tack free time was measured in accordance with the procedure described in AMS 3265B, § 3.6.8, test procedure AS5127/1, § 5.8.
[5]Cure hardness was measured in accordance with the procedure described in AMS 3265B, § 3.6.9, test procedure AS5127/1, § 5.9.
[6]Adhesion was measured at various conditions in accordance with the procedure described in AMS 3265B, § 3.6.23, test procedure AMS 3265, § 4.6.4.
[7]Tensile strength and elongation were measured at various conditions in accordance with the procedure described in AMS 3265B, § 3.6.20, test procedure AS5127/1, § 7.7.

It will be readily appreciated by those skilled in the art that modifications may be made to the invention without departing from the concepts disclosed in the foregoing description.

Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A polymer comprising a structure comprising the formula:

$$-R^1-[\{-S-CH_2-CH(R^3)-R^2-CH(R^3)-CH_2-\}_m-S-R^1-]_n-$$

wherein:
R$^1$ is independently selected from a $C_{2-10}$ n-alkylene group, a $C_{2-6}$ branched alkylene group, a $C_{6-8}$ cycloalkylene group, a $C_{6-10}$ alkylcycloalkylene group, $-[(-CH_2-)_p-X-]_q-(-CH_2-)_r-$, or $-[(-CH_2-)_p-X-]_q-(-CH_2-)_r-$, wherein at least one $-CH_2-$ unit is substituted with a methyl group, wherein
p is an integer having a value ranging from 2 to 6,
q is an integer having a value ranging from 1 to 5,
r is an integer having a value ranging from 2 to 10, and
X is selected from O, S, and —NR—, wherein R is hydrogen or methyl,
R$^2$ denotes $$-CH_2-O-C(O)-$$

R$^3$ is independently selected from hydrogen and an alkyl group;
n is an integer having a value ranging from 1 to 60; and
m is a rational number from 1 to 10; and
wherein the polymer is prepared by the steps of:
(1) reacting a compound comprising at least two reactive thiol groups with allyl (meth)acrylate in the presence of a basic catalyst under Michael addition reaction conditions to form a prepolymer; and
(2) reacting the prepolymer in a radical-initiated addition reaction to form the polymer.

2. The polymer of claim 1, comprising a structure comprising the formula:

$$A(-[R^3]_y-R^4)_2$$

wherein
A denotes a structure comprising the formula of claim 1,
y is 0 or 1,
R$^3$ denotes a single bond when y is 0 and $-S-(CH_2)_2-[-O-R^2-]_m-O-$, wherein
m is a rational number having a value ranging from 0 to 10, when y is 1; and
R$^4$ denotes a thiol group or $-S-(-CH_2-)_{2+s}-O-R^5$ when y is 0 and $-CH=CH_2$ or $-(-CH_2-)_2-S-R^5$ when y is 1, wherein
s is an integer having a value ranging from 0 to 10, and
R$^5$ denotes a $C_{1-6}$ n-alkyl group which is unsubstituted or substituted with at least one —OH or —NHR group, wherein R is H or a $C_{1-6}$ n-alkyl group.

3. The polymer of claim 1, wherein the reactant comprising at least two thiol groups comprises a monomeric polythiol comprising a dithiol having the formula:

$$HS-R-SH$$

wherein
R denotes a $C_{2-10}$ n-alkylene group, a $C_{2-6}$ branched alkylene group, a $C_{6-8}$ cycloalkylene group, a $C_{6-10}$ alkylcycloalkylene group, $-[(-CH_2-)_p-X-]_q-(-CH_2-)_r-$, or $-[(-CH_2-)_p-X-]_q-(-CH_2-)_r-$ in which at least one $-CH_2-$ unit is substituted with a methyl group, wherein
p is an integer ranging from 2 to 6,
q is an integer ranging from 1 to 5,
r is an integer ranging from 2 to 10, and
X is selected from O, S or, —NR—, where R is hydrogen or methyl.

4. The polymer of claim 1, wherein the reactant comprising at least two thiol groups comprises a polymeric polythiol comprising a thiol-terminated polymer prepared by reacting reactants comprising (i) a polyvinyl ether monomer and (ii) a polythiol monomer.

5. The polymer of claim 4, wherein the polymeric polythiol comprises a structure comprising the formula:

$$HS-R^1-[-S-(CH_2)_p-O-[-R^2-O-]_m(CH_2-)_p-S-R^1-]_n-SH$$

wherein,
R$^1$ denotes a $C_{2-10}$ n-alkylene group, a $C_{2-6}$ branched alkylene group, a $C_{6-8}$ cycloalkylene group, a $C_{6-10}$ alkylcycloalkylene group, a heterocyclic group, $-[(-CH_2-)_p-X-]_q-(-CH_2-)_r-$; or $-[(-CH_2-)_p-X-]_q-(-CH_2-)_r-$ in which at least one $-CH_2-$ unit is substituted with a methyl group, wherein
p is an integer having a value ranging from 2 to 6,
q is an integer having a value ranging from 1 to 5,
r is an integer having a value ranging from 2 to 10, and
X denotes O, S, or —NHR—, wherein R denotes H or methyl;
R$^2$ denotes methylene, a $C_{2-10}$ n-alkylene group, a $C_{2-6}$ branched alkylene group, a $C_{6-8}$ cycloalkylene group, a $C_{6-14}$ alkylcycloalkylene, a heterocyclic group, or $-[(-CH_2-)_p-X-]_q-(-CH_2-)_r-$, wherein
p is an integer having a value ranging from 2 to 6,
q is an integer having a value ranging from 1 to 5,
r is an integer having a value ranging from 2 to 10, and
X denotes O, S, or —NHR—, wherein R denotes H or methyl;
m is a rational number having a value ranging from 1 to 50;
n is an integer having a value ranging from 1 to 60; and
p is an integer having a value ranging from 2 to 6.

6. The polymer of claim 1, wherein the polymer comprises a structure having the formula:

$$A-[-R^1-\{-S-CH_2-CH(R^3)-R^2-CH(R^3)-CH_2-\}_m-S-R^1-]_n-A$$

wherein A is —SH or —CH=CH$_2$.

7. The polymer of claim 1, comprising a structure comprising the formula:

$$B(A-(-[R^3]_y-R^4)_z$$

wherein
B denotes a z-valent residue of a polyfunctionalizing agent,
A denotes a structure comprising the formula of claim 1,
y is 0 or 1,
z is an integer having a value ranging from 3 to 6,
R$^3$ denotes a single bond when y is 0 and $-S-(CH_2)_2-[-O-R^2-]_m-O-$, wherein m is a rational number having a value ranging from 0 to 10, when y is 1, and
R$^4$ denotes —SH or $-S-(-CH_2-)_{2+s}-O-R^5$ when y is 0 and $-CH=CH_2$ or $-(-CH_2-)_2-S-R^5$ when y is 1, wherein s is an integer having a value ranging from 0 to 10, and $R^5$ denotes a $C_{1-6}$ n-alkyl group which is unsubstituted or substituted with at least one —OH or —NHR group, wherein R is H or a $C_{1-6}$ n-alkyl group.

8. The polymer of claim 7, wherein the polyfunctionalizing agent comprises at least one trifunctionalizing agent selected from triallyl cyanurate, 1,2,3-propanetrithiol, and mixtures thereof.

9. A method for making the polymer of claim 1 comprising a polymer comprising a structure comprising the formula:

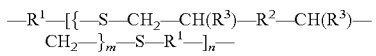

wherein:
R$^1$ is independently selected from a $C_{2-10}$ n-alkylene group, a $C_{2-6}$ branched alkylene group, a $C_{6-8}$ cycloalkylene group, a $C_{6-10}$ alkylcycloalkylene group, $[(-CH_2-)_p-X-]_q-(-CH_2-)_r-$, or $-[(-CH_2-)_p-X-]_q-(-CH_2-)_r-$, wherein at least one —CH$_2$— unit is substituted with a methyl group, wherein
p is an integer having a value ranging from 2 to 6,
q is an integer having a value ranging from 1 to 5,
r is an integer having a value ranging from 2 to 10, and
X is selected from O, S, and —NR—, wherein R is hydrogen or methyl,
R$^2$ denotes

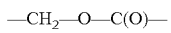

R$^3$ is independently selected from hydrogen and an alkyl group;
n is an integer having a value ranging from 1 to 60; and
m is a rational number from 1 to 10;
comprising:
reacting a compound comprising at least two reactive thiol groups with an allyl (meth)acrylate in the presence of a catalyst under Michael addition reaction conditions to form a prepolymer; and
reacting the prepolymer in a radical initiated addition reaction to form the polymer.

10. The method of claim 9, further comprising reacting 0.05 to 2 moles of a compound having the formula:

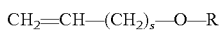

wherein:
R denotes $C_{1-6}$ n-alkyl which is unsubstituted or substituted with at least one —OH or —NHR group, wherein R denotes H or a $C_{1-6}$ n-alkyl group, and is an integer from 0 to 10
with the compound comprising at least two reactive thiol groups and the allyl (meth)acrylate.

11. The method of claim 9, further comprising reacting 0.05 to 2 moles of a compound having the formula:

wherein R denotes $C_{1-6}$ n-alkyl which is unsubstituted or substituted with at least one —OH or —NHR group, wherein R denotes H or a $C_{1-6}$ n-alkyl group with the compound comprising at least two reactive thiol groups and the allyl (meth)acrylate.

12. The method of claim 9, wherein the compound comprising at least two reactive thiol groups comprises a dithiol having the formula:

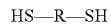

wherein
R denotes a $C_{2-10}$ n-alkylene group, a $C_{2-6}$ branched alkylene group, a $C_{6-8}$ cycloalkylene group, a $C_{6-10}$ alkylcycloalkylene group, $-[(-CH_2-)_p-X-]_q-(-CH_2-)_r-$, or $-[(-CH_2-)_p-X-]_q-(-CH_2-)_r-$ in which at least one —CH$_2$— unit is substituted with a methyl group, wherein
p is an integer having a value ranging from 2 to 6,
q is an integer having a value ranging from 1 to 5,
r is an integer having a value ranging from 2 to 10, and
X is selected from O, S, and —NR—, wherein R is hydrogen or methyl.

13. The method of claim 9, wherein the compound comprising at least two reactive thiol groups comprises a polymeric polythiol comprising a thiol-terminated polymer prepared by reacting reactants comprising (i) a polyvinyl ether monomer and (ii) a polythiol monomer.

14. The method of claim 9, wherein reacting the prepolymer comprises reacting in the presence of comprising a free-radical inhibitor.

15. The method of claim 9, wherein reacting a compound comprising at least two reactive thiol groups with an allyl (meth)acrylate comprises reacting (>n) moles of a compound comprising at least two reactive thiol groups with (n) moles of an allyl (meth)acrylate.

16. The method of claim 9, wherein the catalyst is selected from an inorganic base, an organic base, an azo compound, an organic peroxide, and an inorganic peroxide.

17. A curable composition comprising the polymer of claim 1.

18. The curable composition of claim 17, further comprising at least one curing agent comprising at least two reactive groups reactive with the reactive groups of the polymer.

19. The curable composition of claim 18, wherein the at least one curing agent comprises an epoxy functional resin.

20. A method of at least partially coating a substrate with the curable composition of claim 17 comprising: (a) applying the curable composition to at least a portion of the substrate, and (b) curing the composition.

21. A method of at least partially sealing a substrate with the curable composition of claim 17 comprising: (a) applying the curable composition to at least a portion of the substrate, and (b) curing the composition.

22. A cured composition formed from the curable composition of claim 17.

* * * * *